(12) United States Patent
Swerzenski et al.

(10) Patent No.: US 11,400,886 B2
(45) Date of Patent: Aug. 2, 2022

(54) SYSTEMS AND METHODS FOR DETERRING GUEST EVACUATIONS

(71) Applicant: Universal City Studios LLC, Universal City, CA (US)

(72) Inventors: David Thomas Swerzenski, Orlando, FL (US); Mark Andrew Thomas, Oviedo, FL (US); Jerald Thomas Dwyer, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 551 days.

(21) Appl. No.: 16/526,594

(22) Filed: Jul. 30, 2019

(65) Prior Publication Data
US 2020/0369236 A1 Nov. 26, 2020

Related U.S. Application Data

(60) Provisional application No. 62/851,960, filed on May 23, 2019.

(51) Int. Cl.
| | |
|---|---|
| *B60R 22/02* | (2006.01) |
| *A63G 31/00* | (2006.01) |
| *A63G 7/00* | (2006.01) |
| *B60R 21/00* | (2006.01) |

(52) U.S. Cl.
CPC .............. *B60R 22/02* (2013.01); *A63G 31/00* (2013.01); *A63G 7/00* (2013.01); *B60R 2021/0097* (2013.01)

(58) Field of Classification Search
CPC .......... A63G 1/34; A63G 21/00; A63G 21/17; A63G 25/00; A63G 31/10; B60R 22/02

USPC .............. 472/43, 59, 117, 128; 104/53, 241; 256/11

See application file for complete search history.

(56) References Cited

U.S. PATENT DOCUMENTS

| | | | |
|---|---|---|---|
| 5,277,662 | A | 1/1994 | Fox et al. |
| 5,433,153 | A | 7/1995 | Yamada |
| 5,758,582 | A | 6/1998 | Gnezdilov |
| 5,853,193 | A | 12/1998 | Marshall |

(Continued)

FOREIGN PATENT DOCUMENTS

GB 2149313 A 6/1985

OTHER PUBLICATIONS

PCT/US2020/033647 International Search Report and Written Opinion dated Aug. 27, 2020.

*Primary Examiner* — Kien T Nguyen
(74) *Attorney, Agent, or Firm* — Fletcher Yoder P.C.

(57) ABSTRACT

Systems and methods presented herein include an evacuation deterrence system that includes a vehicle having a member configured to deter evacuation of passengers from the vehicle. The evacuation deterrence system also includes an evacuation deterrence device configured to latch onto the member of the vehicle. The evacuation deterrence device includes an elongated main body, a handle portion, a latch mechanism configured to latch onto the member of the vehicle, an actuation mechanism configured to actuate the latch mechanism, and a positioning mechanism configured to fix a first location of the elongated main body relative to the vehicle. The elongated main body is configured to be extended relative to the vehicle when the first location of the elongated main body is fixed relative to the vehicle via the positioning mechanism.

20 Claims, 7 Drawing Sheets

(56) References Cited

U.S. PATENT DOCUMENTS

| | | | |
|---|---|---|---|
| 7,156,443 B1 * | 1/2007 | Jung | B60N 2/24 |
| | | | 296/68.1 |
| 7,694,640 B2 * | 4/2010 | Blum | B60R 21/02 |
| | | | 297/487 |
| 8,132,513 B2 | 3/2012 | Crawford et al. | |
| 8,490,550 B2 | 7/2013 | Crawford et al. | |

* cited by examiner

SYSTEMS AND METHODS FOR DETERRING GUEST EVACUATIONS

CROSS-REFERENCE TO RELATED APPLICATION

This application claims priority to and the benefit of U.S. Provisional Application No. 62/851,960, entitled "Systems and Methods for Deterring Guest Evacuations," filed May 23, 2019, which is hereby incorporated by reference in its entirety for all purposes.

BACKGROUND

The present disclosure relates generally to the field of amusement parks. More specifically, embodiments of the present disclosure relate to systems and methods for deterring premature guest evacuation from amusement park attractions, such as ride vehicles.

At certain times when amusement park attractions are not in use, for example, after an amusement park ride vehicle has completed a trip around a ride path, guests who are using the attractions may attempt to disembark from the attractions before certain procedures relating to the particular attraction have been performed. Doing so may lead to the guests not disembarking from the attraction at the correct locations, for example, which may lead to logistical issues relating to themselves as well as other guests of the amusement park. As such, there is a need to facilitate more orderly evacuations from the attractions.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In certain embodiments, a device includes an elongated main body. The device also includes a handle portion disposed at a first end of the elongated main body. The device further includes a latch mechanism disposed at a second end of the elongated main body. The latch mechanism is configured to latch onto a member of an enclosure. In addition, the device includes an actuation mechanism disposed along a length of the elongated main body between the first and second ends of the elongated main body. The actuation mechanism is configured to actuate the latch mechanism. The device also includes a positioning mechanism disposed along the length of the elongated main body between the first and second ends of the elongated main body. The positioning mechanism is configured to fix a first location of the elongated main body relative to the enclosure. The elongated main body is configured to be extended relative to the enclosure when the first location of the elongated main body is fixed relative to the enclosure via the positioning mechanism.

In addition, in certain embodiments, an evacuation deterrence system includes a vehicle configured to accommodate one or more passengers. The vehicle includes a member configured to deter evacuation of the one or more passengers from the vehicle. The evacuation deterrence system also includes an evacuation deterrence device configured to latch onto the member of the vehicle. The evacuation deterrence device includes an elongated main body. The evacuation deterrence device also includes a handle portion disposed at a first end of the elongated main body. The evacuation deterrence device further includes a latch mechanism disposed at a second end of the elongated main body. The latch mechanism is configured to latch onto the member of the vehicle. In addition, the evacuation deterrence device includes an actuation mechanism disposed along a length of the elongated main body between the first and second ends of the elongated main body. The actuation mechanism is configured to actuate the latch mechanism. The evacuation deterrence device also includes a positioning mechanism disposed along the length of the elongated main body between the first and second ends of the elongated main body. The positioning mechanism is configured to fix a first location of the elongated main body relative to the vehicle. The elongated main body is configured to be extended relative to the vehicle when the first location of the elongated main body is fixed relative to the vehicle via the positioning mechanism.

In addition, in certain embodiments, a device includes a substantially linear handle arm. The device also includes a substantially linear extension arm connected to the handle arm via a substantially 90 degree first bend. The extension arm is configured to extend along a longitudinal axis of the extension arm. In addition, the extension arm includes one or more compliant supports configured to mate with contoured edges of a vehicle to fix a first location of the extension arm relative to the vehicle. The extension arm also includes a stopper plate configured to abut a surface of the vehicle to fix a second location of the extension arm relative to the vehicle when the extension arm is extended relative to the vehicle. The device further includes a substantially linear latch arm connected to the extension arm via a substantially 90 degree second bend. The latch arm is substantially perpendicular to the handle arm. The latch arm includes a spring-loaded hook disposed at an end of the latch arm opposite the second bend. The spring-loaded hook is configured to latch onto a member of the vehicle. In addition, the device includes a cable physically coupled to a cable at a first end of the cable. The cable is physically coupled to the spring-loaded hook at a second end of the cable. The cable pull is configured to open the spring-loaded hook by counteracting the spring-loading of the spring-loaded hook.

Various refinements of the features noted above may be undertaken in relation to various aspects of the present disclosure. Further features may also be incorporated in these various aspects as well. These refinements and additional features may exist individually or in any combination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example to allow for deviations associated with manufacturing imperfections and associated tolerances.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure provides guest evacuation deterrence systems configured to prevent guests from attempting to evacuate amusement park attractions at inadvisable times and/or in inadvisable directions. Specifically, the embodiments described herein provide guest evacuation deterrence devices configured to physically interact with certain amusement park ride vehicles in a manner that facilitates appropriate guest evacuations from the ride vehicles. For example, in certain embodiments, the guest evacuation deterrence devices described herein include a latch arm having a latch mechanism configured to latch onto a fixed member, or other portion, of an amusement park ride vehicle (e.g., to facilitate evacuation of one or more guests from the ride vehicle), a positioning mechanism configured to fix a first location of the guest evacuation deterrence device relative to the ride vehicle, an extension arm configured to extend the latch mechanism toward the ride vehicle once the positioning mechanism of the guest evacuation deterrence device fixes the first location relative to the ride vehicle, a stop mechanism configured to abut a surface of the ride vehicle to ensure that the latch mechanism is positioned properly with respect to the ride vehicle after the extension arm has been extended, and an actuation mechanism configured to open the latch mechanism (e.g., to release the fixed member of the ride vehicle). As described in greater detail herein, these features of the guest evacuation deterrence devices facilitate a series of reproducible steps capable of ensuring appropriate guest evacuations from amusement park ride vehicles.

While the disclosed embodiments are generally described in the context of amusement park ride vehicles, it should be understood that the guest evacuation deterrence systems and devices described herein may also be used in other contexts. For example, the guest evacuation deterrence systems and devices described herein may be used in conjunction with other amusement park attractions that include structures within which amusement park guests may stand or be seated. Indeed, the guest evacuation deterrence systems and devices described herein may also be extended to other applications (i.e., applications other than amusement parks). Accordingly, the particular construction of the guest evacuation deterrence systems and devices described herein (e.g., materials, shapes, sizes, and so forth) may be implemented according to the desired application.

Figure 1:
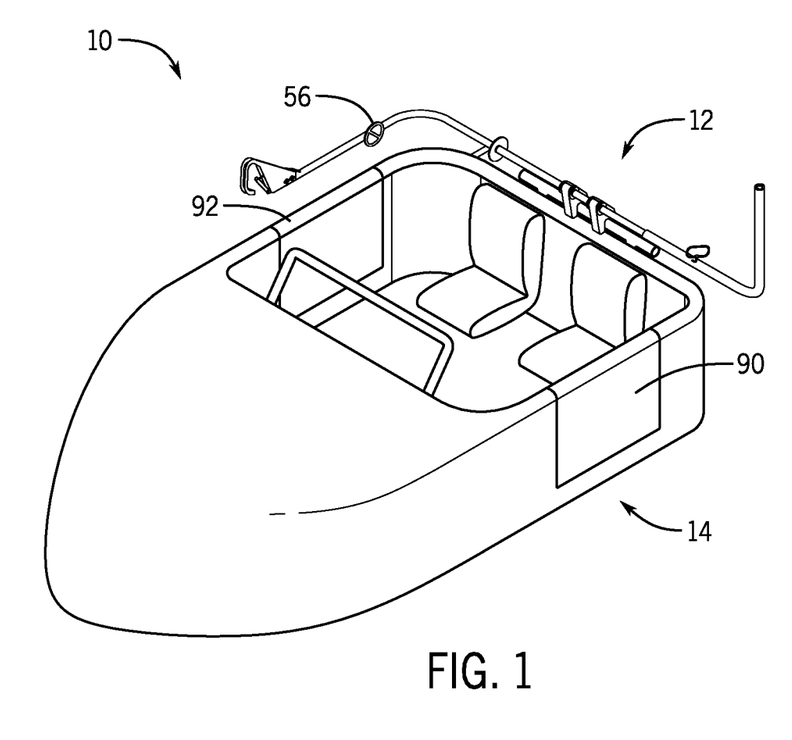
FIG. 1 is a perspective view of a guest evacuation deterrence system, in accordance with embodiments of the present disclosure.

FIG. 1 is a perspective view of a guest evacuation deterrence system 10. Specifically, as illustrated in FIG. 1, in certain embodiments, the guest evacuation deterrence system 10 includes a guest evacuation deterrence device 12 configured to physically interact with a ride vehicle 14 to ensure that guests riding in the ride vehicle 14 disembark the ride vehicle 14 at an appropriate time. For example, as described in greater detail herein, the guest evacuation deterrence device 12 may be configured to physically interact with the ride vehicle 14 to unlock, for example, a door of the ride vehicle 14 to allow the guests to evacuate the ride vehicle 14, and then to disengage from the ride vehicle 14.

Figure 2:
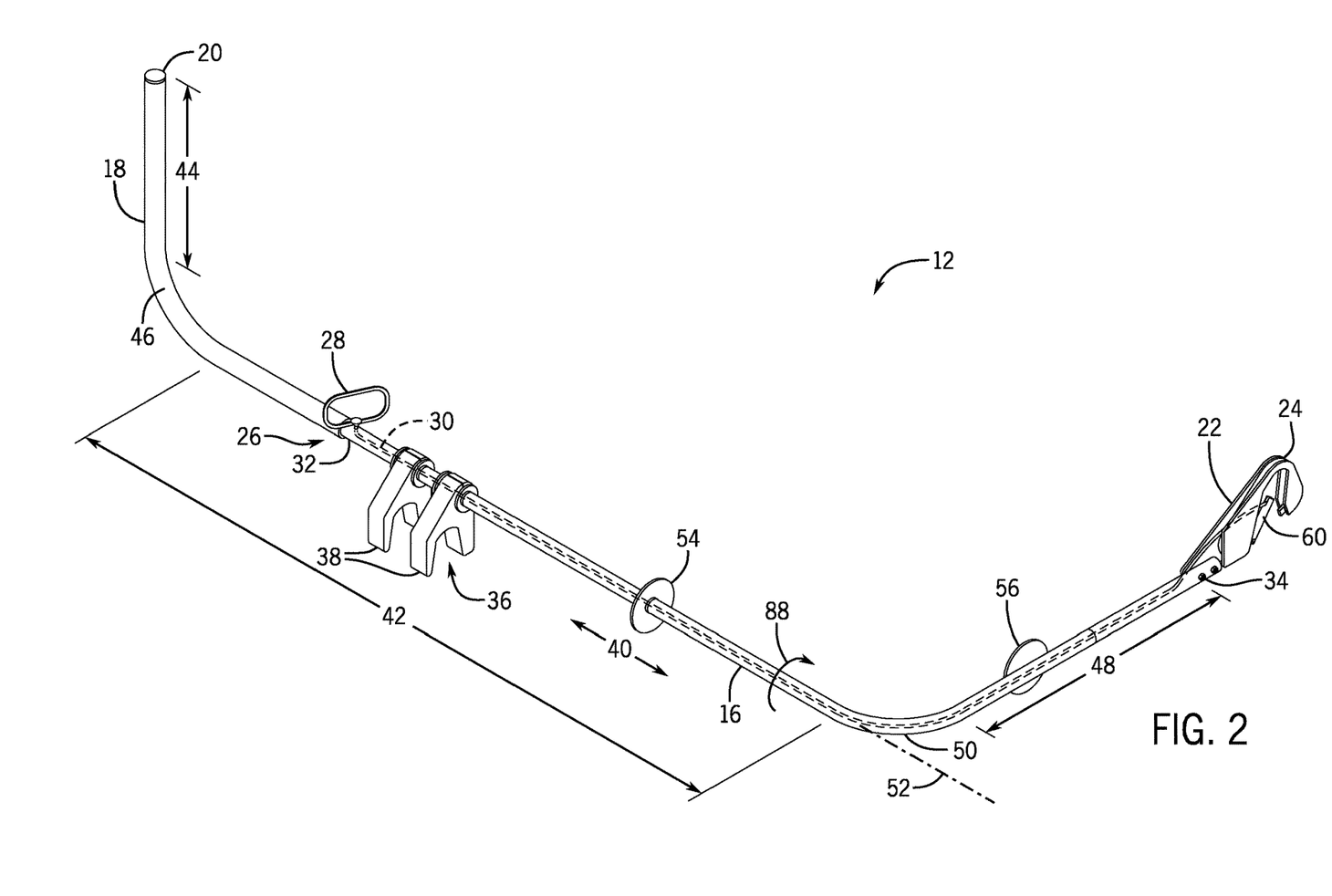
FIG. 2 is a perspective view of a guest evacuation deterrence device of FIG. 1, in accordance with embodiments of the present disclosure.

FIG. 2 is a perspective view of the guest evacuation deterrence device 12 of FIG. 1. As illustrated, in certain embodiments, the guest evacuation deterrence device 12 may include an elongated main body 16 having a handle 18 disposed at a first end 20 of the elongated main body 16, and a latch mechanism 22 disposed at a second end 24 (i.e., opposite the first end 20) of the elongated main body 16. In certain embodiments, the elongated main body 16 may be a hollow tubular member, such as aluminum tubing having a relatively smaller diameter (e.g., 1 inch or 25 millimeter diameter). However, it will be appreciated that other embodiments of the elongated main body 16 may utilize different materials, sizes, and so forth.

As described in greater detail herein, in certain embodiments, the latch mechanism 22 may include a hook with a spring-loaded latch, which is configured to latch onto, and release, a fixed member of an amusement park ride vehicle, such as the ride vehicle 14 illustrated in FIG. 1. However, it will be appreciated that other embodiments of the latch mechanism 22 may utilize different implementations for latching onto, and releasing, the fixed member of the amusement park ride vehicle. As described in greater detail herein, in certain embodiments, the latch mechanism 22 may be configured to automatically latch onto the fixed member of the amusement park ride vehicle when the latch mechanism 22 is moved into position with respect to the fixed member of the amusement park ride vehicle. Subsequently, the latch mechanism 22 may release the fixed member of the amusement park ride vehicle, as described in greater detail herein. In addition, it will be appreciated that the design of the latch mechanism 22 described herein also prevents guests from inadvertently knocking the guest evacuation deterrence device 12 from the fixed member of the amusement park ride vehicle.

As also illustrated in FIG. 2, in certain embodiments, the guest evacuation deterrence device 12 may include an actuation mechanism 26 disposed along a length of the elongated main body 16 between the first end 20 and the second end 24 of the elongated main body 16. In general, the actuation mechanism 26 is configured to actuate the latch mechanism 22 to, for example, release the fixed member of the amusement park ride vehicle. As described in greater detail herein, in certain embodiments, the actuation mechanism 26 may include a cable pull 28 that is physically coupled to a cable 30 that extends through an interior volume of the elongated main body 16 from the cable pull 28 to the latch mechanism 22. More specifically, in certain embodiments, the cable 30 is physically coupled to the cable pull 28 at a first end 32 of the cable 30, and is physically coupled to the latch mechanism 22 at a second end 34 of the cable 30, as described in greater detail herein. In certain embodiments, the actuation mechanism 26 may be configured to open the latch mechanism 22 by counteracting the spring-loading of the latch mechanism 22. However, it will be appreciated that other embodiments of the actuation mechanism 26 may utilize different implementations for actuating the latch mechanism 22 (e.g., such as a handle/lever combination configured to manipulate the cable 30, and so forth).

As also illustrated in FIG. 2, in certain embodiments, the guest evacuation deterrence device 12 may also include a positioning mechanism 36 disposed along the length of the elongated main body 16 between the first end 20 and the second end 24 of the elongated main body 16. In general, the positioning mechanism 36 is configured to fix a first location of the elongated main body 16 relative to an amusement park ride vehicle. As described in greater detail herein, in certain embodiments, the positioning mechanism 36 may include one or more compliant supports 38 (e.g., rubber or other elastomer supports) configured to mate with contoured edges of the ride vehicle to fix the first location of the elongated main body 16 relative to the ride vehicle. However, it will be appreciated that other embodiments of the positioning mechanism 36 may utilize different implementations for fixing the first location of the elongated main body 16 relative to an amusement park ride vehicle.

As described in greater detail herein, in certain embodiments, the elongated main body 16 may be configured to be extended (e.g., as illustrated by arrow 40) relative to an amusement park ride vehicle when the first location of the elongated main body 16 is fixed relative to the ride vehicle via the positioning mechanism 36. Specifically, as also described in greater detail herein, in certain embodiments, the elongated main body 16 may include a substantially linear extension arm 42 configured to be extended (e.g., as illustrated by arrow 40) relative to an amusement park ride vehicle when the first location of the elongated main body 16 is fixed relative to the ride vehicle via the positioning mechanism 36, a substantially linear handle arm 44 connected to the extension arm 42 at a first bend 46 of the elongated main body 16, and a substantially linear latch arm 48 connected to the extension arm 42 at a second bend 50 of the elongated main body 16. As used herein, the term "substantially linear" is intended to describe features (e.g., the various arms 42, 44, 48 of the elongated main body 16) that are linear along the length of the features within only minor variations from linear (e.g., within 5 degrees, within 4 degrees, within 3 degrees, within 2 degrees, within 1 degree, or even more linear) with respect to end points of the features.

As described in greater detail herein, in certain embodiments, the first and second bends 46, 50 of the elongated main body 16 may be substantially 90 degree bends, for example, such that the handle arm 44 and the latch arm 48 are both substantially perpendicular to the extension arm 42. Indeed, in certain embodiments, the handle arm 44 and the latch arm 48 may also be substantially perpendicular to each other, such that rotation of the guest evacuation deterrence device 12 about a longitudinal axis 52 of the extension arm 42 facilitates manipulation of the guest evacuation deterrence device 12 for the purpose of physically interacting with a fixed member of an amusement park ride vehicle. As used herein, the term "substantially perpendicular" is intended to describe features (e.g., the various arms 42, 44, 48 of the elongated main body 16) that are perpendicular with each other within only minor variations from perpendicular (e.g., within 5 degrees, within 4 degrees, within 3 degrees, within 2 degrees, within 1 degree, or even more linear) with respect to end points of the features. Similarly, the term "substantially 90 degree" is intended to describe an angle (e.g., of the first and second bends 46, 50) that is between 87 degrees and 93 degrees, between 88 degrees and 92 degrees, between 89 degrees and 91 degrees, or even closer to 90 degrees.

As also illustrated in FIG. 2, in certain embodiments, the guest evacuation deterrence device 12 may also include a stop mechanism 54 disposed along the length of the elongated main body 16 between the first end 20 and the second end 24 of the elongated main body 16. In general, the stop mechanism 54 is configured to abut a surface of an amusement park ride vehicle to fix a second location of the elongated main body 16 relative to the amusement park ride vehicle when the extension arm 42 has been extended relative to the amusement park ride vehicle. As described in greater detail herein, in certain embodiments, the stop mechanism 54 may include a metal stopper plate configured to abut the surface of the amusement park ride vehicle to fix the second location of the elongated main body 16 relative to the amusement park ride vehicle when the extension arm 42 is extended relative to the amusement park ride vehicle. However, it will be appreciated that other embodiments of the stop mechanism 54 may utilize different implementations for fixing the second location of the elongated main body 16 relative to an amusement park ride vehicle.

Figure 11:
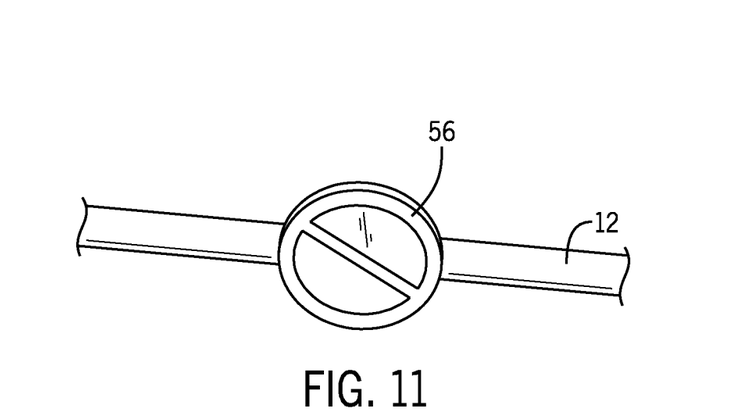
FIG. 11 illustrates a sign of the guest evacuation deterrence device, in accordance with embodiments of the present disclosure.

As also illustrated in FIG. 2, in certain embodiments, the guest evacuation deterrence device 12 may also include a sign 56, for example, a universal language no-entrance sign to notify guests of the amusement park ride vehicle that they should not attempt to evacuate the amusement park ride vehicle at that time and/or in the direction of the guest evacuation deterrence device 12. For example, FIG. 11 illustrates the sign 56 of the guest evacuation deterrence device 12. It will be appreciated that, in certain embodiments, due at least in part to the orientation of the sign 56, when the latch mechanism 22 of the guest evacuation deterrence device 12 is engaging the fixed member of the amusement park ride vehicle (i.e., when the guests may properly evacuate the amusement park ride vehicle), the sign 56 may be hidden from view, for example, within an interior portion of the amusement park ride vehicle.

Figure 3:
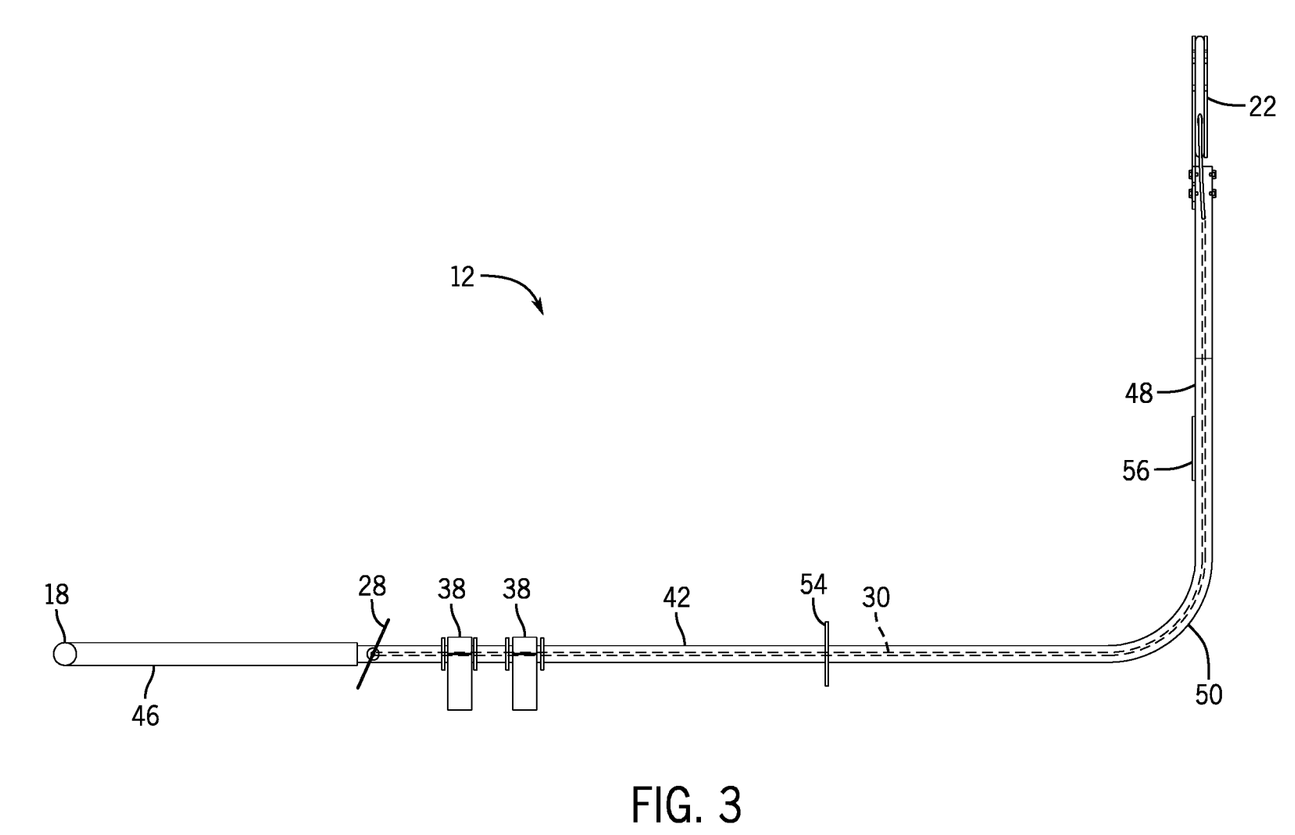
FIG. 3 is a top view of the guest evacuation deterrence device of FIG. 2, in accordance with embodiments of the present disclosure.
Figure 4:
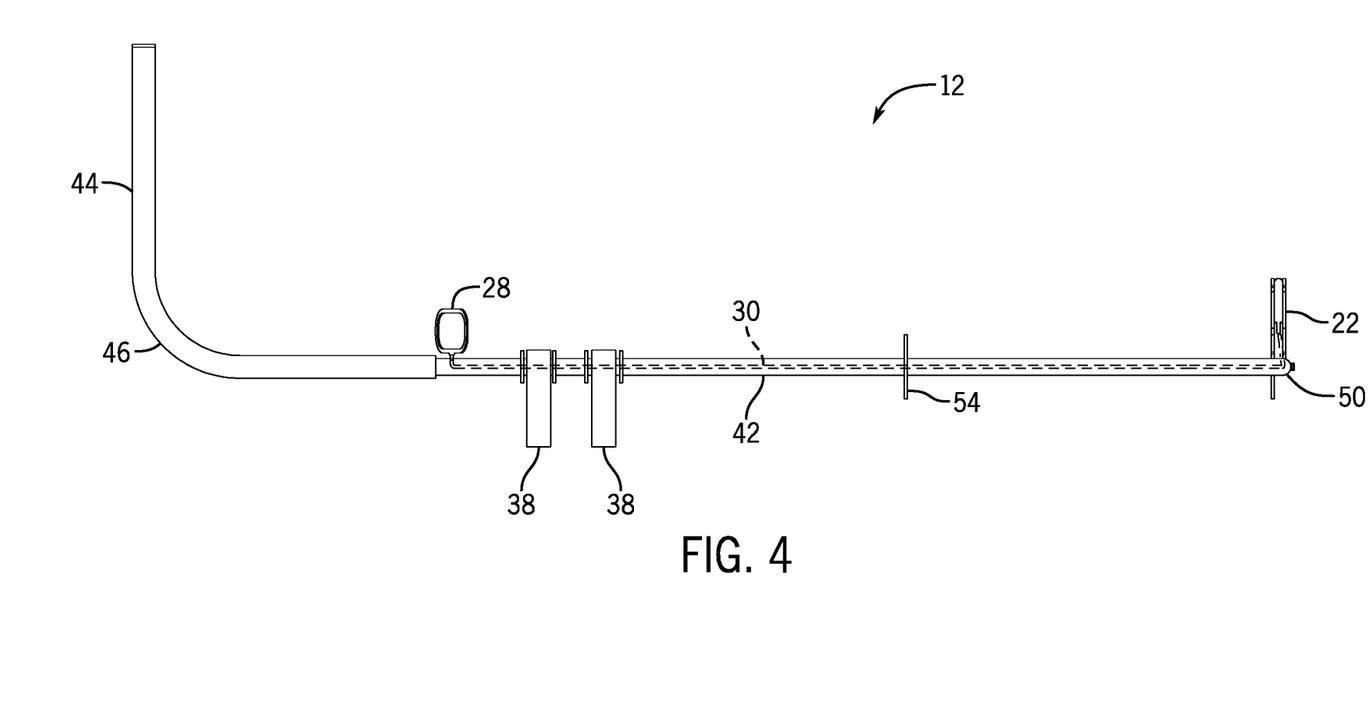
FIG. 4 is a side view of the guest evacuation deterrence device of FIG. 2, in accordance with embodiments of the present disclosure.

FIG. 3 is a top view of the guest evacuation deterrence device 12 of FIG. 2. In addition, FIG. 4 is a side view of the guest evacuation deterrence device 12 of FIG. 2. As illustrated, in certain embodiments, the cable pull 28 of the actuation mechanism 26, the one or more compliant supports 38, and the stop mechanism 54 are disposed consecutively along a length of the extension arm 42 between the first bend 46 and the second bend 50 of the guest evacuation deterrence device 12.

Figure 5:
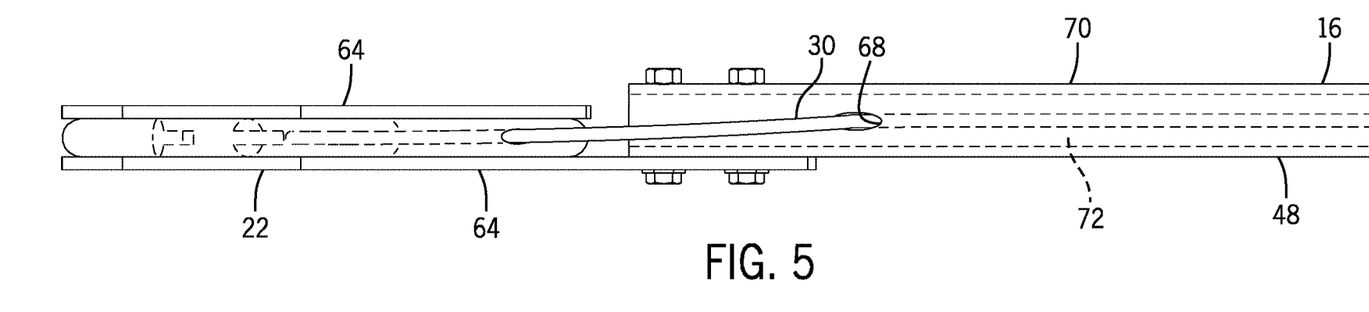
FIG. 5 is a top view of a latch mechanism and a portion of a latch arm of the guest evacuation deterrence device of FIG. 2, in accordance with embodiments of the present disclosure.
Figure 6:
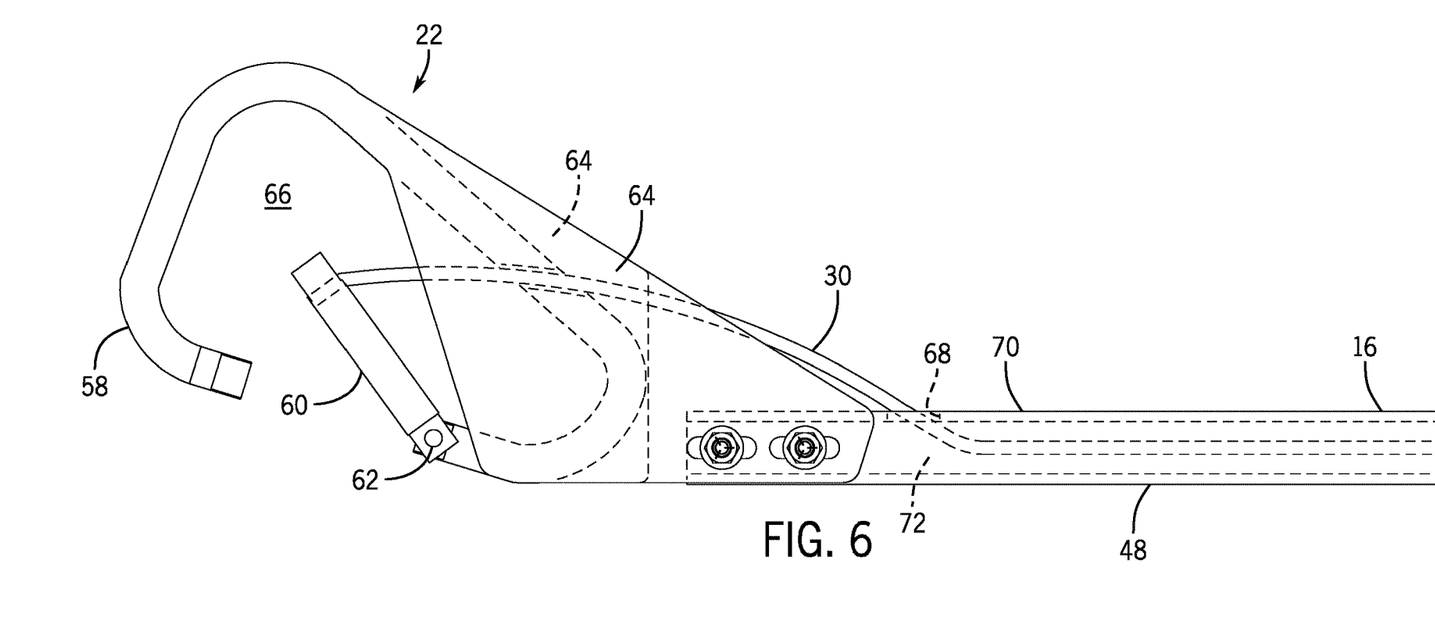
FIG. 6 is a side view of the latch mechanism and the portion of the latch arm of the guest evacuation deterrence device of FIG. 2, in accordance with embodiments of the present disclosure.

FIG. 5 is a top view of the latch mechanism 22 and a portion of the latch arm 48 of the guest evacuation deterrence device 12 of FIG. 2. In addition, FIG. 6 is a side view of the latch mechanism 22 and the portion of the latch arm 48 of the guest evacuation deterrence device 12 of FIG. 2. As illustrated in FIG. 6, in certain embodiments, the latch mechanism 22 includes a main hook portion 58 and a latch 60 physically coupled to the main hook portion 58 at a hinge point 62. As illustrated in FIGS. 5 and 6, in certain embodiments, the main hook portion 58 may be physically coupled to the latch arm 48 by one or more coupling plates 64. Specifically, as illustrated in FIG. 5, in certain embodiments, the main hook portion 58 may be physically coupled to the latch arm 48 via two coupling plates 64 disposed on opposite sides of both the main hook portion 58 and the latch arm 48.

In certain embodiments, the latch 60 may be spring-loaded such that the latch 60 is biased toward a closed position with respect to the main hook portion 58, but may allow certain objects (e.g., a fixed member of an amusement park ride vehicle) to push the latch 60 into a partially open position to allow the objects to enter a space 66 defined by the main hook portion 58 (i.e., to allow the latch mechanism 22 to latch onto the objects), then returning to the closed position once the objects have entered the space 66 defined by the main hook portion 58. In certain embodiments, to release the objects from within the space 66 defined by the main hook portion 58, the latch 60 may be actuated into a partially open position by the actuation mechanism 26 described herein. Specifically, as illustrated in FIG. 6, in certain embodiments, the cable 30 may be physically coupled to the latch 60 to enable the actuation mechanism 26 described herein to counteract the spring-loaded nature of the latch 60 to, for example, release certain objects (e.g., a fixed member of an amusement park ride vehicle) that have been latched onto by the latch mechanism 22. As illustrated in FIG. 6, in certain embodiments, the latch arm 48 may include a small opening 68 through a wall 70 of the latch arm 48 to enable the cable 30 to pass from within an interior volume 72 of the latch arm 48 to facilitate the physical coupling of the cable 30 to the latch 60 external to the latch arm 48.

Figure 7:
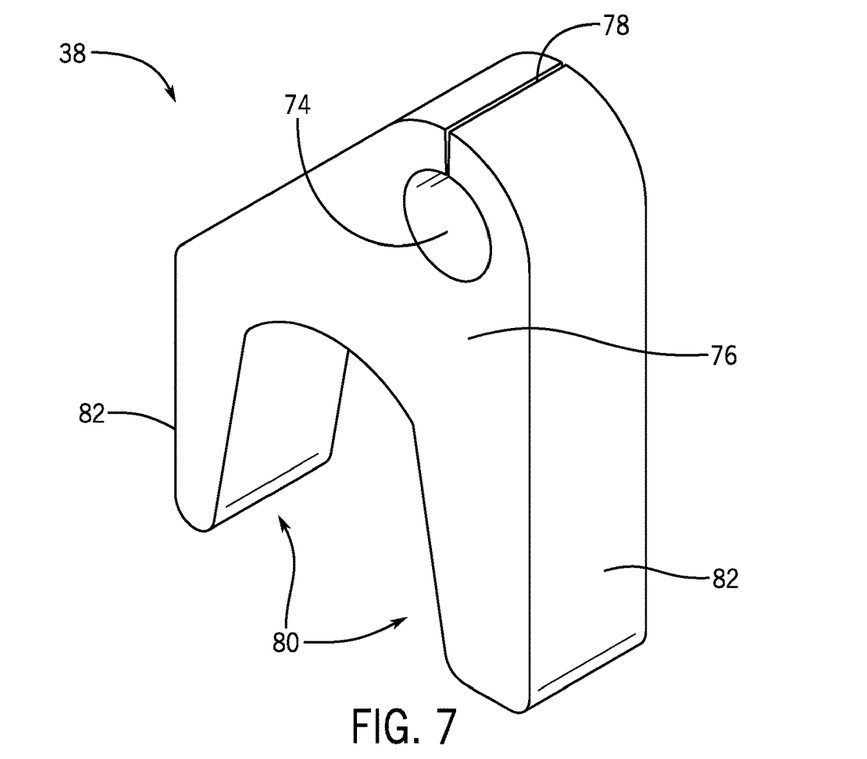
FIG. 7 is a perspective view of a compliant support of the guest evacuation deterrence device of FIG. 2, in accordance with embodiments of the present disclosure.

FIG. 7 is a perspective view of a compliant support 38 of the guest evacuation deterrence device 12 of FIG. 2. As illustrated, in certain embodiments, the compliant support 38 includes an opening 74 that extends all the way through a main body portion 76 of the compliant support 38 such that the elongated main body 16 (e.g., specifically, the extension arm 42) of the guest evacuation deterrence device 12 may fit within the opening 74. As illustrated, in certain embodiments, the main body portion 76 of the compliant support 38 may include a slit 78 that extends through the main body portion 76 substantially parallel with the opening 74, wherein the slit 78 facilitates the elongated main body 16 (e.g., specifically, the extension arm 42) of the guest evacuation deterrence device 12 being inserted into the opening 74. Specifically, it will be appreciated that the compliant nature of the compliant support 38 may be relatively easily manipulated to allow the extension arm 42 to be inserted into the opening 74.

Figure 8:
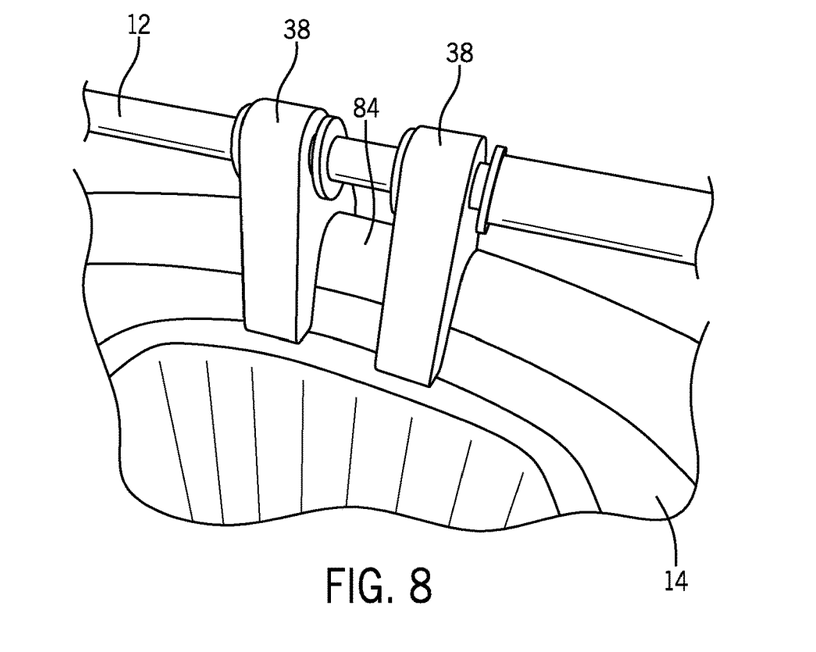
FIG. 8 illustrates two compliant supports of the guest evacuation deterrence device mating with a contoured surface of a ride vehicle to fix a first position of the guest evacuation deterrence device relative to the ride vehicle, in accordance with embodiments of the present disclosure.

As also illustrated in FIG. 7, in certain embodiments, the compliant support 38 may include certain positioning features 80, such as legs 82 that extend from the main body portion 76 of the compliant support 38. The positioning features 80 may be specifically designed to mate with (e.g., abut) certain contoured edges of, for example, a ride vehicle to fix a first position of the guest evacuation deterrence device 12 relative to the ride vehicle. For example, FIG. 8 illustrates two compliant supports 38 of a guest evacuation deterrence device 12 mating with a contoured surface 84 of a ride vehicle 14 to fix a first position of the guest evacuation deterrence device 12 relative to the ride vehicle 14.

Figure 9:
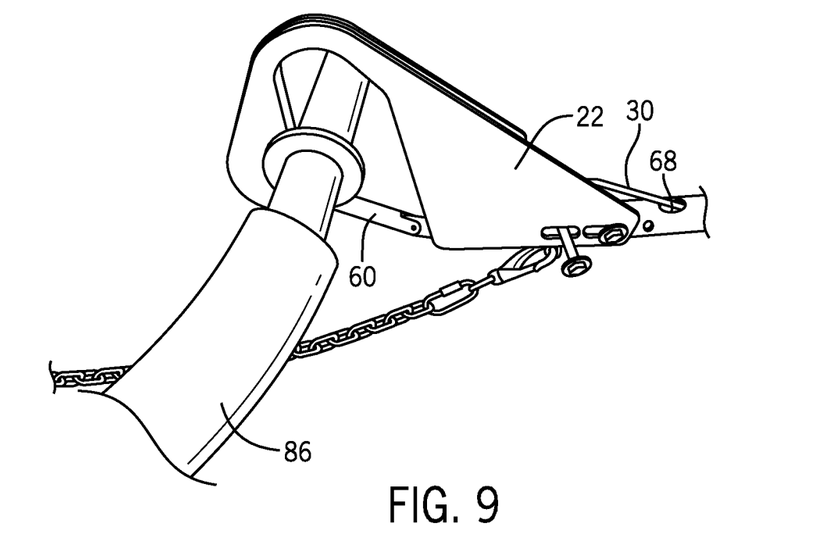
FIG. 9 illustrates a latch mechanism of the guest evacuation deterrence device after latching onto a fixed member associated with a ride vehicle, in accordance with embodiments of the present disclosure.
Figure 10:
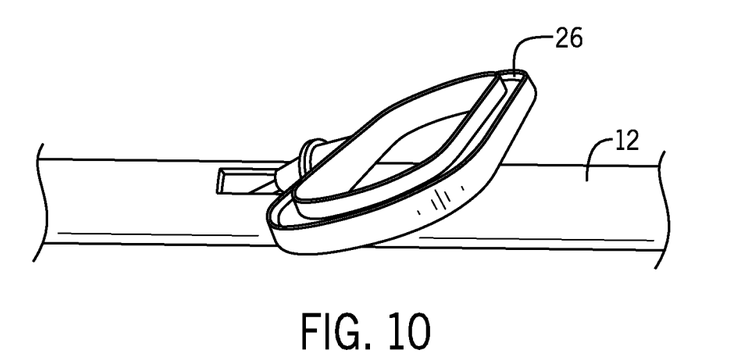
FIG. 10 illustrates an actuation mechanism of the guest evacuation deterrence device that may be used to actuate a latch of the latch mechanism to facilitate release of the fixed member of the ride vehicle, in accordance with embodiments of the present disclosure.

As described in greater detail herein, in certain embodiments, the latch mechanism 22 of the guest evacuation deterrence device 12 is configured to latch onto certain objects due at least in part to the spring-loaded nature of a latch 60 of the latch mechanism 22. For example, FIG. 9 illustrates a latch mechanism 22 of the guest evacuation deterrence device 12 after latching onto a fixed member 86 associated with a ride vehicle 14. As described in greater detail herein, the latch 60 of the latch mechanism 22 may be actuated (e.g., by the actuation mechanism 26) to release the fixed member 86 of the ride vehicle 14 from the latch mechanism 22. For example, FIG. 10 illustrates an actuation mechanism 26 (e.g., as a cable pull 28, in the illustrated embodiment) that may be used to actuate the latch 60 of the latch mechanism 22 to facilitate release of the fixed member 86 of the ride vehicle 14.

As described herein, the guest evacuation deterrence device 12 is configured to physically interact with, for example, a ride vehicle 14 to prevent guests from attempting to evacuate the ride vehicle 14 at inadvisable times and/or in inadvisable directions. In operation, for example, the guest evacuation deterrence device 12 may be held by an operator at the handle 18 in an orientation such that the latch arm 48 is at a 90 degree angle with respect to the ground. The operator may then begin to lower the guest evacuation deterrence device 12 down onto the contoured surface 84 of the ride vehicle 14 (see, e.g., FIG. 10) until the one or more compliant supports 38 of the guest evacuation deterrence device 12 are seated properly against the ride vehicle (i.e., to fix a first predetermined location of the guest evacuation deterrence device 12 relative to the ride vehicle). Then, the operator may extend the extension arm 42 of the guest evacuation deterrence device 12, as illustrated by arrow 40, until the stop mechanism 54 makes contact with another surface of the ride vehicle (i.e., to fix a second predetermined location of the guest evacuation deterrence device 12 relative to the ride vehicle). Once the one or more compliant supports 38 and the stop mechanism 54 of the guest evacuation deterrence device 12 are in their respective predetermined locations, the operator may use the handle 18 to rotate the guest evacuation deterrence device 12 about the longitudinal axis 52 of the extension arm 42, as illustrated by arrow 88, such that the latch arm 48 rotates approximately 90 degrees (e.g., between 80 degrees and 100 degrees, between 85 degrees and 95 degrees, between 88 degrees and 92 degrees, and so forth) in the counterclockwise direction, for example, until the spring-loaded latch 60 of the latch mechanism 22 captures the fixed member 86 of the ride vehicle 14 (see, e.g., FIG. 9). At this point, the guests may evacuate the ride vehicle, and the operator may then use the actuation mechanism 26 to open the latch 60 of the latch mechanism 22 to release the fixed member 86 of the ride vehicle 14. Then, the operator may perform the procedure in reverse order, and remove the guest evacuation deterrence device 12 from the ride vehicle 14.

Returning now to FIG. 1, in certain embodiments, the ride vehicle 14 may include a door 90 disposed on one side of the ride vehicle 14, and a gap, door 92, or equivalent on the opposite side of the ride vehicle 14. As described in greater detail herein, the guest evacuation deterrence device 12 is configured to prevent guests from exiting the ride vehicle 14 in a non-preferred manner during an evacuation or regular operation of the ride vehicle 14 through, for example, an otherwise intuitive-looking path (e.g., the door 92). In particular, as illustrated in FIG. 1, the guest evacuation deterrence device 12 may be configured to block the guests from exiting the ride vehicle 14 via such paths. In addition, as described in greater detail herein, the sign 56 on the guest evacuation deterrence device 12 may warn the guests against taking such paths.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. A device, comprising:
   an elongated main body;
   a handle portion disposed at a first end of the elongated main body;
   a latch mechanism disposed at a second end of the elongated main body, wherein the latch mechanism is configured to latch onto a member of an enclosure;
   an actuation mechanism disposed along a length of the elongated main body between the first and second ends of the elongated main body, wherein the actuation mechanism is configured to actuate the latch mechanism; and
   a positioning mechanism disposed along the length of the elongated main body between the first and second ends of the elongated main body, wherein the positioning mechanism is configured to fix a first location of the elongated main body relative to the enclosure, and wherein the elongated main body is configured to be extended relative to the enclosure when the first location of the elongated main body is fixed relative to the enclosure via the positioning mechanism.

2. The device of claim 1, wherein the latch mechanism comprises a hook configured to latch onto the member of the enclosure.

3. The device of claim 1, wherein the latch mechanism is spring-loaded, and wherein the actuation mechanism is configured to open the latch mechanism by counteracting the spring-loading of the latch mechanism.

4. The device of claim 1, wherein the actuation mechanism comprises a cable pull physically coupled to a cable at a first end of the cable, wherein the cable is physically coupled to the latch mechanism at a second end of the cable.

5. The device of claim 1, wherein the elongated main body comprises a substantially linear extension arm configured to be extended relative to the enclosure when the first location of the elongated main body is fixed relative to the enclosure via the positioning mechanism, a substantially linear handle arm connected to the extension arm at a first bend of the elongated main body, and a substantially linear latch arm connected to the extension arm at a second bend of the elongated main body.

6. The device of claim 5, wherein the first and second bends comprise substantially 90 degree bends.

7. The device of claim 6, wherein the handle arm is substantially perpendicular to the latch arm.

8. The device of claim 5, wherein the extension arm comprises a stop mechanism configured to abut a surface of the enclosure to fix a second location of the elongated main body relative to the enclosure when the extension arm is extended relative to the enclosure.

9. The device of claim 1, wherein the positioning mechanism comprises one or more compliant supports configured to mate with contoured edges of the enclosure.

10. The device of claim 1, wherein the enclosure comprises a vehicle of an amusement park ride.

11. An evacuation deterrence system, comprising;
    a vehicle configured to accommodate one or more passengers, wherein the vehicle comprises a fixed member configured to deter evacuation of the one or more passengers from the vehicle; and
    an evacuation deterrence device configured to latch onto the fixed member of the vehicle, wherein the evacuation deterrence device comprises:
    an elongated main body;
    a handle portion disposed at a first end of the elongated main body;
    a latch mechanism disposed at a second end of the elongated main body, wherein the latch mechanism is configured to latch onto the fixed member of the vehicle;
    an actuation mechanism disposed along a length of the elongated main body between the first and second ends of the elongated main body, wherein the actuation mechanism is configured to actuate the latch mechanism; and a positioning mechanism disposed along the length of the elongated main body between the first and second ends of the elongated main body, wherein the positioning mechanism is configured to fix a first location of the elongated main body relative to the vehicle, and wherein the elongated main body is configured to be extended relative to the vehicle when the first location of the elongated main body is fixed relative to the vehicle via the positioning mechanism.

12. The evacuation deterrence system of claim 11, wherein the latch mechanism comprises a hook configured to latch onto the fixed member of the vehicle.

13. The evacuation deterrence system of claim 11, wherein the latch mechanism is spring-loaded, and wherein the actuation mechanism is configured to open the latch mechanism by counteracting the spring-loading of the latch mechanism.

14. The evacuation deterrence system of claim 11, wherein the actuation mechanism comprises a cable pull physically coupled to a cable at a first end of the cable, wherein the cable is physically coupled to the latch mechanism at a second end of the cable.

15. The evacuation deterrence system of claim 11, wherein the elongated main body comprises a substantially linear extension arm configured to be extended relative to the vehicle when the first location of the elongated main body is fixed relative to the vehicle via the positioning mechanism, a substantially linear handle arm connected to the extension arm at a first bend of the elongated main body, and a substantially linear latch arm connected to the extension arm at a second bend of the elongated main body.

16. The evacuation deterrence system of claim 15, wherein the first and second bends comprise substantially 90 degree bends.

17. The evacuation deterrence system of claim 16, wherein the handle arm is substantially perpendicular to the latch arm.

18. The evacuation deterrence system of claim 15, wherein the extension arm comprises a stop mechanism configured to abut a surface of the vehicle to fix a second location of the elongated main body relative to the vehicle when the extension arm is extended relative to the vehicle.

19. The evacuation deterrence system of claim 11, wherein the positioning mechanism comprises one or more compliant supports configured to mate with contoured edges of the vehicle.

20. A device, comprising:
a substantially linear handle arm;
a substantially linear extension arm connected to the handle arm via a substantially 90 degree first bend, wherein the extension arm is configured to extend along a longitudinal axis of the extension arm, and wherein the extension arm comprises:
one or more compliant supports configured to mate with contoured edges of a vehicle to fix a first location of the extension arm relative to the vehicle; and
a stopper plate configured to abut a surface of the vehicle to fix a second location of the extension arm relative to the vehicle when the extension arm is extended relative to the vehicle;
a substantially linear latch arm connected to the extension arm via a substantially 90 degree second bend, wherein the latch arm is substantially perpendicular to the handle arm, and wherein the latch arm comprises a spring-loaded hook disposed at an end of the latch arm opposite the second bend, wherein the spring-loaded hook is configured to latch onto a fixed member of the vehicle; and
a cable pull physically coupled to a cable at a first end of the cable, wherein the cable is physically coupled to the spring-loaded hook at a second end of the cable, and wherein the cable pull is configured to open the spring-loaded hook by counteracting the spring-loading of the spring-loaded hook.

* * * * *